No. 620,869. Patented Mar. 7, 1899.
H. A. HORTON.
CORN COMPRESSOR OR BINDER.
(Application filed Aug. 29, 1898.)
(No Model.)
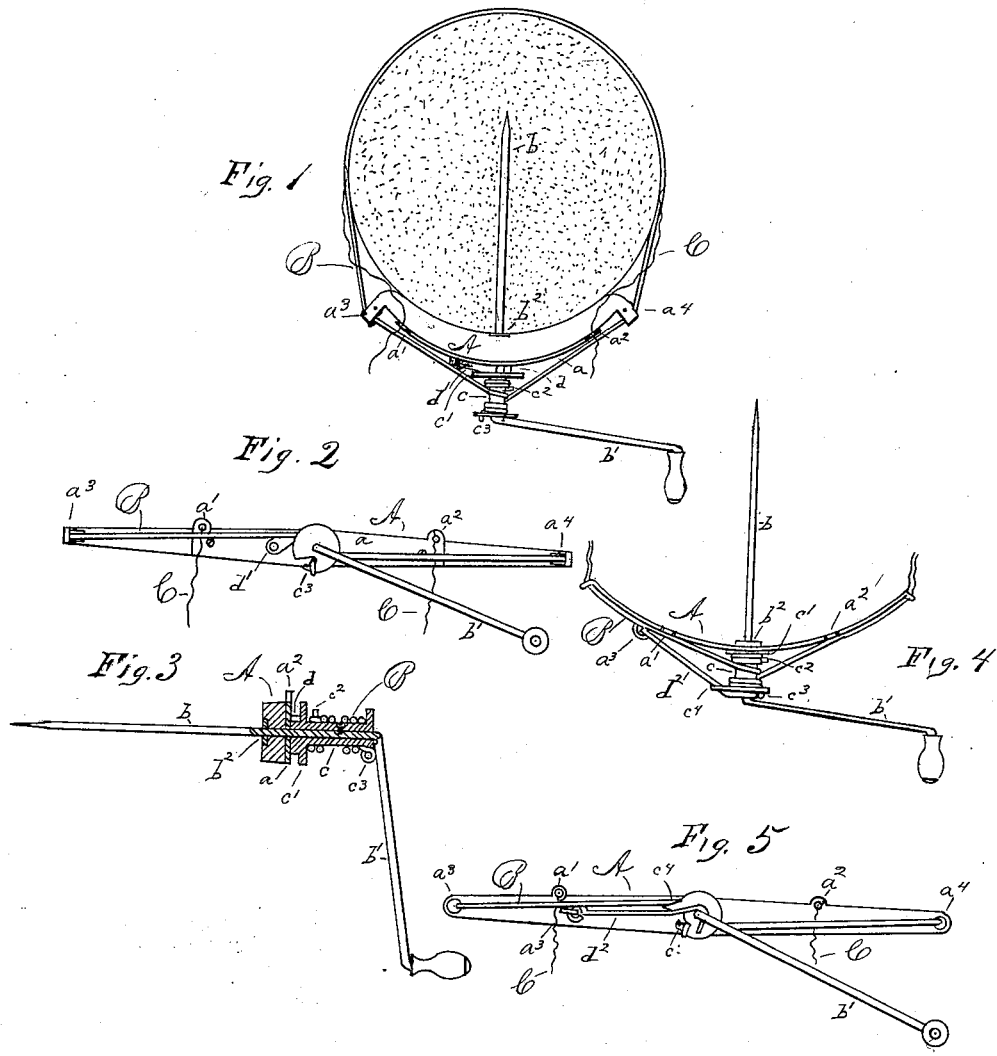
Witnesses.
C. E. Randall
Ida L. Randall
Inventor.
Hazen A. Horton

UNITED STATES PATENT OFFICE.

HAZEN A. HORTON, OF TEKONSHA, MICHIGAN, ASSIGNOR OF ONE-HALF TO EDWARD P. KEEP, OF SAME PLACE.

CORN COMPRESSOR OR BINDER.

SPECIFICATION forming part of Letters Patent No. 620,869, dated March 7, 1899.

Application filed August 29, 1898. Serial No. 689,801. (No model.)

*To all whom it may concern:*

Be it known that I, HAZEN A. HORTON, a citizen of the United States, residing at Tekonsha, in the county of Calhoun and State of Michigan, have invented certain new and useful Improvements in Corn-Binders, of which the following is a specification.

My invention relates to improvements in corn-binders in which an arc-shaped framework provided with a spindle having a windlass carrying a cord or encircling band to compress the shock and operative with a crank is employed; and the objects of my invention are, first, to provide a quick and easy means to compress the shock for placing and securing a band thereabout, and, second, to provide a cheap and effective compress whereby the shock may be very tightly drawn, and thus be of economical use where twine is employed for binding material. I attain these objects by the mechanism illustrated in the accompanying drawings, in which—

Figure 1 is a plan view of a shock in section, the compress or binder engaging the same in the manner for securing the band. Fig. 2 is a front elevation. Fig. 3 is a vertical side section. Figs. 4 and 5 are modifications of my invention.

Similar letters of reference refer to corresponding parts in the different views.

The elliptic or arc piece A is the body or frame, upon the convex side of which is secured a plate $a$, having a spring-eyelet $a'$ and an open clasp $a^2$. The frame is by preference constructed of wood and is secured to the plate by means of screws. Passing through the center of the aforesaid frame and plate and describing a plane therewith is a shank comprising a sharp-pointed spindle $b$ and a crank $b'$. Upon the shank secured thereto and between the crank $b'$ and plate $a$ is a ratchet-wheel $d$ and a drum $c$ intact therewith, having cord-securing pins or eyelets $c^2$ $c^3$ and a distending-flange $c'$, occupying a position between the drum and ratchet, as shown, and operative with said ratchet is a pawl $d'$, pivoted to the frame A.

Within the convex surface of the frame A and located upon the spindle $b$ is a washer or bur $b^2$, which tends to keep the spindle from withdrawing and intact.

Upon the extremities of the frame A are located eyelets or preferably grooved rollers working in eyelets $a^3$ and $a^4$, the eyelet at $a^4$ by preference having a clasp slot, through which the cord B may be drawn to save threading otherwise.

In the modifications the frame A, Figs. 4 and 5, may comprise in one piece the eyelet $a'$ and clasp $a^2$ and eyelets $a^3$ and $a^4$ and be constructed of malleable iron, spring-steel, or material answering to the purpose. In other respects the shank comprising the spindle $b$, crank $b'$, drum $c$, and flange $c'$ is identical; but instead of the ratchet and pawl $d$ and $d'$, Figs. 1, 2, and 3, I employ a hook $d^2$, secured to the frame A by an eyelet $a^3$, said hook being operative with a lip or offset $c^4$ on the outer extremity of the drum $c$ and arranged to hook over the spindle between the crank and drum aforesaid, as shown, and which I find to answer the purpose of the ratchet-and-pawl mechanism in preventing backlash or recoil of the windlass or drum and crank-spindle.

The operation of my invention is as follows: The corn having been shocked, the operator at a point where he wishes to secure the same by band thrusts the spindle $b$ into the shock to the frame A, the frame describing an arc with the shock. One end of the cord or compress B is secured by a pin or eyelet $c^2$, and its opposite end passes through the eyelet and over the grooved roller $a^3$ at one extremity of the frame A, thence is passed around the shock, through the clasp, and over the grooved roller $a^4$, and is secured by the pin or eyelet $c^3$. The crank $b'$ is now moved in a direction operative with the ratchet $d$ and pawl $d'$, winding the cord or compress B about the drum $c$ from either and both ends at the same time until the shock is thoroughly compressed and ready to be bound. Should the operator wish to use twine for binding material, twine C is drawn into the clasp $a'$, thence is passed about the shock and tied, the pawl $d'$ released, the spindle $b$ recoiled, the compress or cord B loosened at one end, and the whole withdrawn from the shock as bound. It is found convenient where binding with twine to pass the compress B and the twine C about the shock at the same time, in which case the loose end of the twine may be held until ready for binding by drawing the same into the clasp $a'$, this clasp answering as well for the purpose as the clasp shown at $a^2$.

By securing both ends of the compress B to the drum before compressing the shock to be bound I gain a double advantage, and in going from shock to shock but one end of the compress is necessarily disengaged from the drum. I am aware, however, that some may seek to employ a similar mechanism by fixing the compress B at one end of the frame—for instance, at $a^3$—thence passing the same about the shock and through the eyelet $a^4$, and by securing said end to the drum draw the same tight by the crank and spindle aforesaid by winding the cord from one direction.

What I claim as new, and desire to secure by Letters Patent, is—

1. The arc-shaped frame A having eyelets at both ends, the plate $a$ having the eyelet $a'$, and secured to the convex side of said frame by screws, in combination with the spindle $b$ passing through the aforesaid frame and plate, the offset $b^2$ located upon said spindle within the concavity of said frame, the crank $b'$ at the outer extremity of the spindle, the ratchet $d$, the flange $c'$, and the drum $c$ having the eyelets $c^2$ and $c^3$ arranged upon the spindle between the crank and frame aforesaid, and the pawl $d'$ pivoted to the frame A, all constructed as, and for the purposes set forth and described.

2. The arc-shaped frame A having the eyelets $a^3$ and $a^4$ at either extremity, the clasp $a'$ located upon the upper face of said frame, the eyelet $a^3$ securing the hook $d^2$ upon the outer face of said frame, and the lip $c^4$ upon the outer face of the drum $c$, in combination with the spindle $b$ passing through the aforesaid frame, the offset $b^2$ located upon said spindle within the concavity of said frame, the crank $b'$ at the outer extremity of the spindle, the flange $c'$, and drum $c$ provided with eyelets $c^2$ and $c^3$ for engaging the cord B passing through the eyelets $a^3$ and $a^4$ of the frame A, the drum $c$ and flange $c'$ arranged upon the spindle between the frame A and the crank $b'$, the hook $d^2$ arranged to engage the lip $c^4$, and lock over the spindle between the crank and drum aforesaid, all arranged substantially as, and for the purposes set forth and described.

HAZEN A. HORTON.

Witnesses:
F. H. DARROW,
E. H. WARNER.